No. 697,928. Patented Apr. 15, 1902.
G. T. & L. WOODS.
MOTOR CONTROLLING APPARATUS.
(Application filed Sept. 3, 1901.)
(No Model.) 3 Sheets—Sheet 1.

Witnesses
Inventors

No. 697,928. Patented Apr. 15, 1902.
G. T. & L. WOODS.
MOTOR CONTROLLING APPARATUS.
(Application filed Sept. 3, 1901.)
(No Model.) 3 Sheets—Sheet 2.
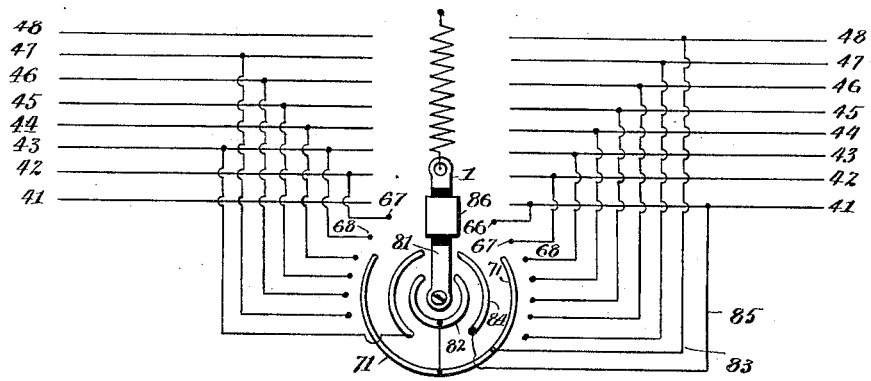
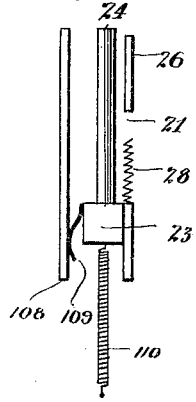
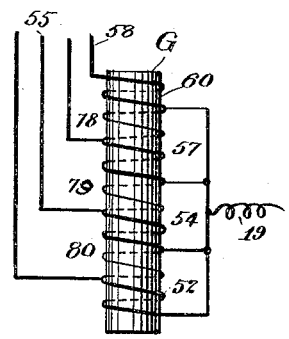
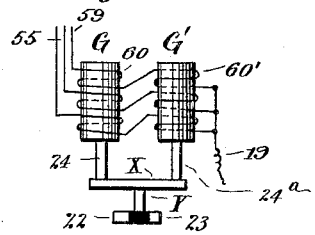
Witnesses
Inventors No. 697,928. Patented Apr. 15, 1902.
G. T. & L. WOODS.
MOTOR CONTROLLING APPARATUS.
(Application filed Sept. 3, 1901.)
(No Model.) 3 Sheets—Sheet 3.

WITNESSES:
L. E. Woods.
M. Lee.

INVENTORS
G. T. Woods.
Lyates Woods.

UNITED STATES PATENT OFFICE.

GRANVILLE T. WOODS AND LYATES WOODS, OF NEW YORK, N. Y., ASSIGNORS, BY DIRECT AND MESNE ASSIGNMENTS, TO HENRY C. TOWNSEND AND DELBERT H. DECKER, TRUSTEES.

MOTOR CONTROLLING APPARATUS.

SPECIFICATION forming part of Letters Patent No. 697,928, dated April 15, 1902.

Application filed September 3, 1901. Serial No. 74,238. (No model.)

*To all whom it may concern:*

Be it known that we, GRANVILLE T. WOODS and LYATES WOODS, citizens of the United States, and residents of New York, in the county of New York and State of New York, have invented certain new and useful Improvements in Motor Controlling Apparatus, of which the following is a specification.

The object of our invention is to provide simple and effective means whereby any one or more motors or other translating devices may be controlled through any appropriate electrically-actuated controller and from any suitable point where a manually-operative switch is located for such purpose. Our system is such that when a car or other vehicle is equipped with two or more motors to drive it such motors may be coupled together in any appropriate way to control the speed of the car or vehicle, and when it is desirous to bring the car or vehicle to rest the manually-operable switch is moved back toward the point from which the switch started, thus permitting the motors to act as generators in a local circuit, thereby tending to utilize the energy of the moving car to destroy its own motion. Such action would take place on each car of a train upon the movement of the manually-actuated switch. Another peculiar point of the present system is that a powerful torque is obtained without useless waste of energy.

We will hereinafter more fully set forth the many advantages to be secured by the emloyment of our present system.

Throughout this specification and the claims we shall use certain terms to indicate the various parts of the apparatus illustrated in the drawings.

"Driving-motor" refers to the car-propelling motor.

"Motive switch" indicates a switch whose motive apparatus is the switch itself. One form of such may be constructed as follows: a single solenoid composed of two kinds of windings, or, in other words, some of the windings are made up in high-resistance sections and the remaining windings are formed of low-resistance wire. Such windings are then connected up in series, the high resistance alternating with the low resistance and circuits leading from predetermined points on such solenoid to other apparatus and a core having a contact-piece which is adapted to control (step by step) contacts in the driving-motor circuit.

"Commuting-switch" refers to the aforesaid manually-operable switch which the motorman will have to use when controlling a train. By the use of this switch he may govern the step-by-step movement of said motive switch, which in turn controls the motor or other translating device or devices.

"Reversing-switch" is the term used to indicate the switch which shifts the circuits, so as to change the direction of the rotation of the driving-motor armature.

"Reversing-magnets" refers to the magnets or solenoids which control the movements of the reversing-switch.

"Coupling-link" is the device employed to connect the electrical equipment on one car to such equipment on an adjacent car.

"Addable units" is a term which we are believed to be the first to employ to indicate a plurality of cars each having an electrical equipment which is adapted to be added to such apparatus on the adjacent car or cars to form a train.

The word "set" as used herein is intended to indicate two or more things of the same general character considered as parts of a whole.

To more fully appreciate the present invention, reference is made to the accompanying drawings, in which similar reference characters indicate corresponding parts.

Figure 1 is a diagrammatic view of one way in which to arrange our apparatus in the equipment of one car. Fig. 2 is a diagrammatic view of the preferred form of solenoid for a motive switch. Fig. 3 is a diagrammatic view of a modification of the connecting-switch. Fig. 4 illustrates in a diagrammatic view two sections of wiring (supposed to be on different cars) joined together by means of an appropriate coupling-link. Fig. 5 shows a sectional diagrammatic view of two fixed coupling-heads and the two heads of the coupling-link. Fig. 6 is a face view of one of the fixed coupling-heads. Fig. 7 is a face view of one of the coupling-link heads. Fig. 8 illustrates a diagrammatic view of a modified form of switch apparatus which is adapted to be used to connect the motor apparatus to the supply-circuit. Fig. 9 is a side view of a section of the core 24, its contact 23, some of the fixed contacts, and the springs and their supports. Fig. 10 illustrates a plurality of solenoids each composed of a series of coils, the arrangement being such that when one coil in one series is given energy the corresponding coil of the other series receives current also. For instance, in the drawings coils 60 and 60' are shown electrically connected in series, so that when energized they act simultaneously upon their cores 24 and 24$^a$, respectively. Such cores in turn act upon bar X, which then shifts contacts 22 23. Such an arrangement is very effective. As the commuting-switch is shifted along from one circuit to another to energize such coils it preferably does not open the circuit of the first two coils until after the second two are energized. Thus the number of such coils in the circuit and the current delivered thereto during a given time will vary.

Referring now to Fig. 1, A is a set of commuting-switch line-wires having four sets of terminal contacts or connectors B C D E and a set of branch wires F, which connect each with a predetermined part of the motive switch G. The terminals or contacts B C when not in use are normally open; but they are adapted to be coupled up to other cars to form a train. The terminals or contacts D E are arranged at the respective ends of the car and remain in open circuit until one switch-arm is brought into use, at which time switch-arm 1 will be moved over the terminals or contacts at D, or switch-arm 2 will be moved over the terminals or contacts at E. When either of such arms are moved, it is for the purpose of actuating motive switch G.

At H H' dash-pots are shown. These devices are connected to the respective switch-arms 1 2 through 3 5 and cords or straps 3' 5'. Springs 4 4', respectively, normally hold said switch-arms at open circuit. The dash-pots prevent the motorman from moving the commuting-switch too rapidly.

I indicates the ordinary trolley-arm and trolley.

J represents a switch which is adapted to be connected to contact 6 or to contact 7, so that current may be supplied to reversing-solenoids K K', respectively, as will be fully set forth hereinafter.

8 and 9 are discharge-circuits so arranged that when either of the coils at K K' are cut out the discharge passes through resistance 8, but when the fields of motors M M' are cut out of the circuit the discharge thus resulting must pass through resistance 9.

At O there is a rheostatic switch which is adapted to regulate the current in the field-circuits of motors M M', such fields being shown in series.

At N a motor-generator is illustrated, 11 12 being the respective fields and 13 14 the respective armatures of such generator. The object of this motor-generator is to control the electromotive force of the current delivered to the armatures of motors M M'. The motor part 11 13 drives the generator part 12 14, which is in series with the armatures of motors M M'. The terminals 20 21 of the said generator-field 12 are so arranged that the contacts 22 23 (of the core 24 of motive switch G) are constantly in electrical connection therewith. There are two fixed low-resistance contacts 25 26, arranged parallel with contacts 20 21, respectively. Said contacts 25 26 are electrically connected together and grounded through wire 29 and car-wheel 18. There are two high-resistance contact-sections 27 28. These latter sections are also arranged parallel to said contacts 20 21, respectively. The said sections 27 28 are electrically connected together and connected by wire 30 to rheostatic switch O. The circuits being thus arranged will permit the motive-switch contacts 22 23 to reverse the direction of the flow of current in the field-circuit 12, as the latter contacts pass from one extreme of their paths to the other extreme thereof. During such change of the field-circuit no change whatever is made in circuits of motor part 11 or in the direction of rotation of either of the armatures 13 14. It is well known that when the field of a generator is reversed while a progressive movement of its armature is maintained the current generated in such armature will change the direction of its flow simultaneously with the reversal of such field. Switch P is connected through wire 33 to trolley I. When this switch is being closed by moving it toward the right, it first connects with resistance 34, thereby delivering current from trolley I through wire 35 to the field 11 and armature 13 of the motor-generator. As the said switch P is progressively moved it makes connection with contacts 36 37. Contact 36 is in electrical connection with switch O and connects through wire 30 with contacts 27 28. Contact 37 is connected through wire 38 to armature 14 of the motor-generator. A conducting-wire 40 leads from armature 14 the armature of motor M. From thence a circuit leads through the armature-motor M' to ground through wheel 17. It will be noted that resistance 19 and the terminals of solenoids K K' are connected together at point 39 and then connect through switch 10 with wire 16 and wheel 17 or with wires 15 40, armatures of motors M M', and wheel 17. The group of wires A are numbered 41 to 48, inclusive. Solenoid K' connects through wire 49 to wire 41 of said group. Lower section of solenoid G is connected through wire 50 with group-wire 42. Solenoid K is connected through wire 51 to group-wire 43. Section 52 of solenoid G communicates through wire 53 with group-wire 44, and the succeeding sections of solenoid G communicate each with its appropriate group-wire, as follows: 55 connects 54 and 45 together, 58 connects 57 and 46 to each other, and 59 couples 60 and 47 together. The upper wire 48 of group A is in communication with trolley I through wires 61 and 33. The resistances 78ª, 74ª, 80ª, and 80ᵇ of the solenoid G are intended to direct the secondary current from one coil to another as the actuating-current is shifted from coil to coil by the commuting-switch. When several cars are connected together to form a train, the commuting-switch wires on one car will be in series with those on the adjacent cars. Therefore were it not for said resistances the sparks would be troublesome.

One method of operation is as follows: We will suppose that switch 10 is closed and switch O is properly adjusted. Then reversing-switch J is to connect with contact 6 or to contact 7. That would depend upon the direction in which the car or vehicle is to move. When such connection is with contact 7, current flows from trolley I over wires 33 and 61 to switch J, thence over 7 49 K' 39 10 M M' 17 to ground. This causes the core of solenoid K' to assume its present position, and thereby (acting through bar 62) shifting switch L to contacts 63 64. Then switch P is closed, distributing current to contacts 34 36 37. The current passes from 34 along wire 35, motor parts 11 13, and wheel 18 to ground. The motor-generator starts up. The initial position of the motive-switch contacts 22 23 is such that they bridge and close the circuits of the motor-generator parts 12 14. This permits current to flow from switch P over contact 36 and wire 30, contacts 28 23 21, field 12, contacts 20 22 25, wire 29, and wheel 18 to ground. At such time the motor-generator part 14 generates a current which opposes the line or power current as the latter current attempts at this time to flow from said distributing-switch P over 37, 38, 14, 40, M, M', and 17 to ground. Now if connecting switch-arm 1 at D is moved toward the right until it bridges contacts 66 67 current will then flow over trolley I, wire 33, thence up to switch J, then upward to wire 41, along which it moves to contact 66, switch 1, contact 67, wire 42 50, lower coil of G, resistance 19, thence over 39, 10, 15, M, M', and 17 to ground. This causes the core 24 to move upward one step, thus causing contacts 22 23 to change their positions. Contact 23 in its movement cuts some of resistance 28 into the field 12. This latter field-magnet 12 having now been weakened, the electromotive force of the counter current generated in armature 14 is now a little lower than the line or power current. Therefore current of large amperage begins to flow from the line over trolley I, wire 33, switch P, wire 38, armature 14, wire 40, the armatures of motors M M', thence through wheel 17 to ground. In the progressive movement of said arm 1 it makes connection with contact 68. As no current is delivered (at this time) over wire 43 and contact 68, then arm 1 must be moved until it makes connection with contact 69, at which time said arm 1 also connects with contact 71, thereby drawing current from trolley I over 61, 48, and 71 and delivering it to contact 69, from whence it passes to 44 53 52 19 39 10 M M' 17. In making this latter movement arm 1 made connection with contacts 69 and 71 before it disconnected from contact 66 66, and current flowing over the last-described circuits causes the motive switch G to cut more of resistance 28 into the circuit of field 12, thereby further weakening such field and correspondingly diminishing the voltage of the energy generated in armature 14. As such voltage falls the line-voltage rises in the armatures of motors M M'. The further movement of arm 1 cuts in the next contact 70, wires 45 55, coil 54, and then 19 39 10 M M' to ground. Motive switch G then moves contacts 22 23 to points 31 32, respectively. Such movement of the latter contacts opens the circuit of field 12, and the full-line voltage now flows through the armatures 14 M M'. A further movement of arm 1 cuts in the next contact, wires 46 58, coil 57, and the aforesaid circuit to ground. Then contacts 22 23 connect with contacts 27 26, respectively, and the direction of the flow of current is reversed through field 12 by passing from the distributing-switch P, then 36 30 to contacts 27 22 20, field 12, then to contacts 21 23 26, then 29 and 18 to ground. With such reversal of field 12 a current is generated in armature 14, and such current flows in series with the line-current and augments the voltage of the same. The final progressive movement of arm 1 cuts in coil 60 of motive switch G, and thereby causing contact 22 of G to cut out resistance 27, so that the full voltage of armature 14 is added to that of the line. The reverse movement of arm 1 causes a retrograde movement of the motive-switch core and contacts 22 23 until they assume their position, as shown in the drawings. The retrograde movement of said contacts 22 and 23 caused the circuits of field-magnet 12 to be again reversed and now restored to the condition and connections which prevailed just before the lower coil of solenoid G received current. Now as the car is supposed to be in motion and as the armature 14 of the motor-generator is constantly operating and its electromotive force is now counter to the line, then the energy transformed by the moving armatures of motors M M' may be returned to the line or partly diverted through the electromagnetic brake device 76. The portion passing to the line will move from M M' over 40, 14, 38, P, 33, and trolley I. The transformed current received by armature 14 causes that armature to increase the speed of both of the armatures of the said motor-generator. The voltage of the current thus returned will gradually drop as the car slows down to a stop.

The portion which may be shunted through said brake device would take the following course upon closing switch 72: passing from M M' up to the two-point switch 10, thence over 39, 73, K', 72, and 76 back to M M', thus completing a local loop. The brake device 76 may be controlled by adjusting-switch 72 or the entire energy so transformed may be regulated by the movement of switch O to vary the strength of the field-magnets of M M'. From the foregoing statements it will be seen that the motor-generator (11 12 13 14) takes current from the main or power line and transforms it by induction or magnetic influence and then feeds it to motors M M'. It will be noted that armature 14 is one form of electromagnetic device which acts in connection with the driving-motor armatures to stop the car, and taking into account the fact that the commuting-switch will (when manual control ceases) automatically open its circuit and thereby permit the controller to assume its normal position it is obvious that the energy transformed or generated by the motors will automatically stop the car. Thus it will be observed that if the motorman should suddenly become helpless on the moving train such train would automatically and quickly come to rest. At this time it is necessary to close switch 72, in case a quick or emergency stop is desired, and as the car is in motion, but drawing no current from the line, the motors will act as generators and send current from M M' 15 10 39 73 K' 49 74 72 75 76. It will be noted that this latter-described circuit is one of low resistance. Therefore the current generated by the armatures of M M' is large, and in addition to its action upon the brake-magnet apparatus at 76 the said armatures M M' act to retard the movement of the car. The car may be brought to rest gradually by the adjustment of switch 72 or by the act of the motor-armatures M M' delivering current to the line when armature 14 counteracts the line-current, as previously described. The brake apparatus 76 acts as a combined track-brake and a wheel-brake. The magnetic action of the current flowing in such apparatus causes the device to hug or cling to the rail and also to press against the car-wheel. We have shown such device in electrical communication with wires 49 and 41. Therefore it is obvious that when a plurality of such cars are coupled up into a train all of the motor-armatures would have access (through their wires corresponding to wires 49 and 41) to the switch 72 on the pilot-car, so that all of the cars in the train would be under the control of the motorman on the pilot-car. When a train is to be moved, all switches (except those to be manipulated on the pilot-car) corresponding to E, J, and 72 must be opened and so maintained during the operation of such train. When the arm 1 is moved to make the first contacts, the same wires 41 43 convey current for both the motor-speed-controlling switch and the motor-reversing switch. To reverse the motors M M', switch J is made to connect with contact 6. Then current will flow from trolley I to switch J, contact 6, solenoid K, point 39, switch 10, armatures of M M' to ground. The solenoid K pulls up its core, and thereby reverses the field-circuit connections at L, thus reversing the motors, and then when arm 1 is moved from its normal position it now finds no current in contact 66. Therefore the movement of the arm must be continued until it connects with contact 68, while it maintains a connection with contact 67, on which the arm slides to make contact with 68. Now current flows from trolley I to switch J, wires 51 43, contact 68, arm 1, contact 67, wire 43, to lower coil of solenoid G, thence over 19 39 10 M M' and 17 to ground.

In Fig 2 the low-resistance sections of the solenoid are numbered 52 54 57 60, as in Fig. 1, and they carry the major portion of the current. The high-resistance sections are 78 79 80. The resistance of these latter sections should be quite high, because they are only intended to direct the secondary current from one coil to another as the commuting-switch shifts the actuating-current from coil to coil.

Fig. 3 has the commuting-switch contacts and circuits so arranged that if switch-arm 1 is moved toward the right part 81 makes connection with contact 82 (which connects through wire 83 to wire 48) and contact 84, which connects through wire 85 to 41. Further movement of arm 1 causes part 86 to connect contacts 66 and 67 together, and then current would flow along wire 41 and pass through contact 67 to wire 42, as described in Fig. 1. Further movement of arm 1 connects contact 71 to 68, as described in Fig. 1. Now if switch 1, Fig. 1, is connected to contact 6 and arm 1, Fig. 3, is moved (from its normal position) toward the left until the lower part 81 of said arm connects contact 82 to the contact leading to wire 43 and the part 86 of said arm connects contacts 67 68 together, then current would flow from trolley I to switch J, where the current would divide, a portion passing through solenoid K, switch 10, thence through M M' and 17 to ground, thereby reversing motors M M'. The remaining portion of said current passes over wire 61 to wire 48 of the group, thence through the contacts 71 82, part 81, (of Fig. 3,) thence to wire 43, contacts 68 67, wire 42, and through the lower coil of solenoid G, Fig. 1, to ground.

Figure 1:
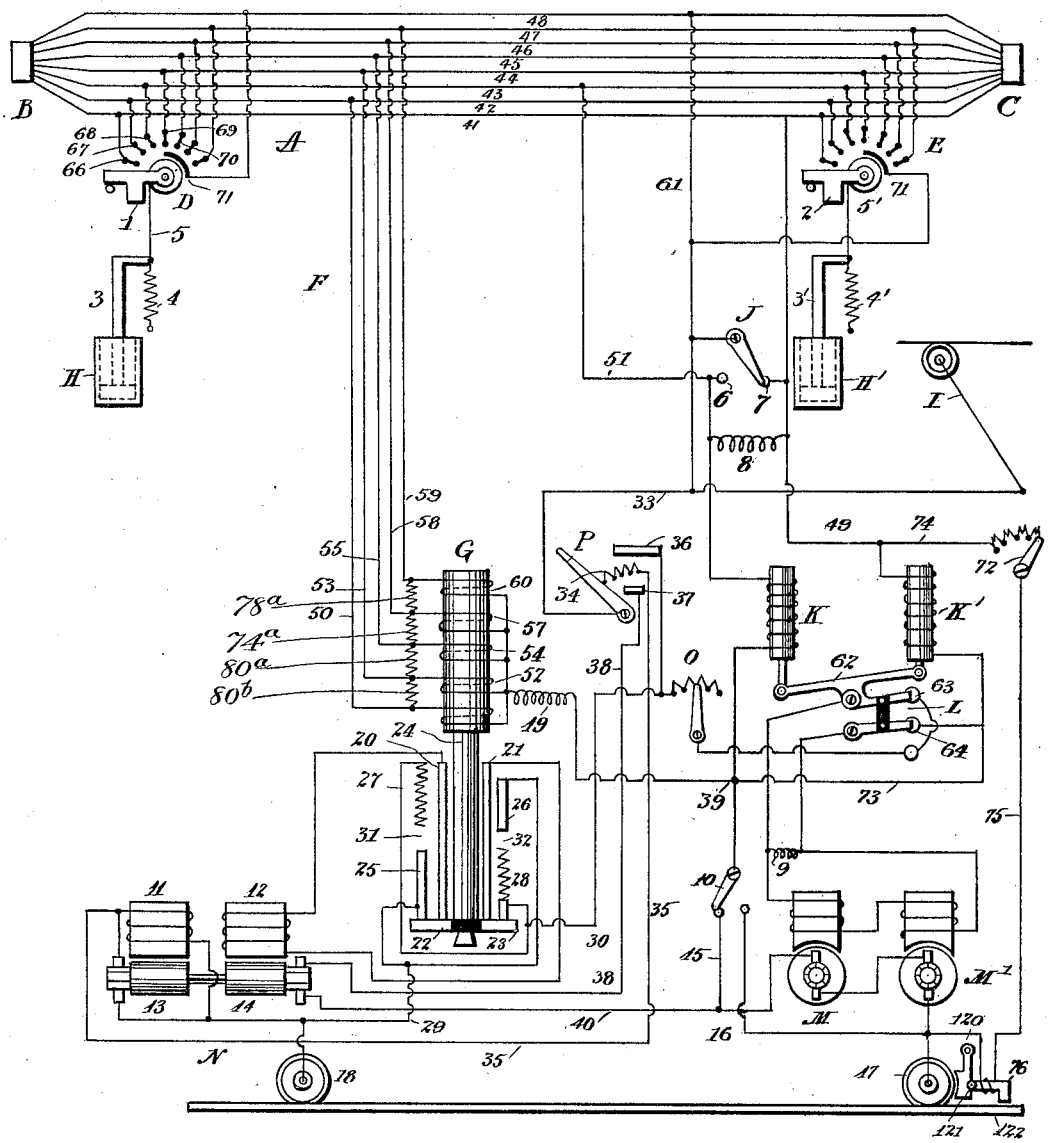
Figure 4:
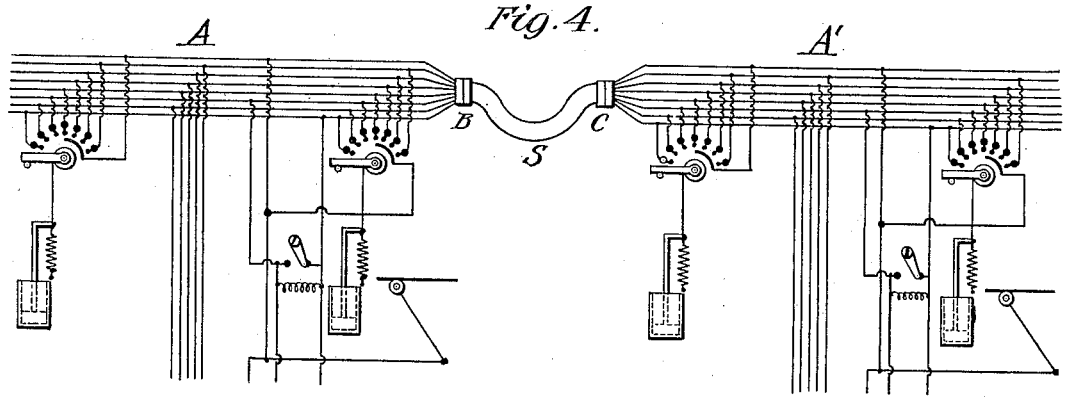
Fig. 4 shows two sections of wire A A' coupled together by an appropriate coupling S. These two sections are supposed to be on two adjacent cars of a train, and they are shown for the purpose of explaining the coupling-link S.
Figure 5:
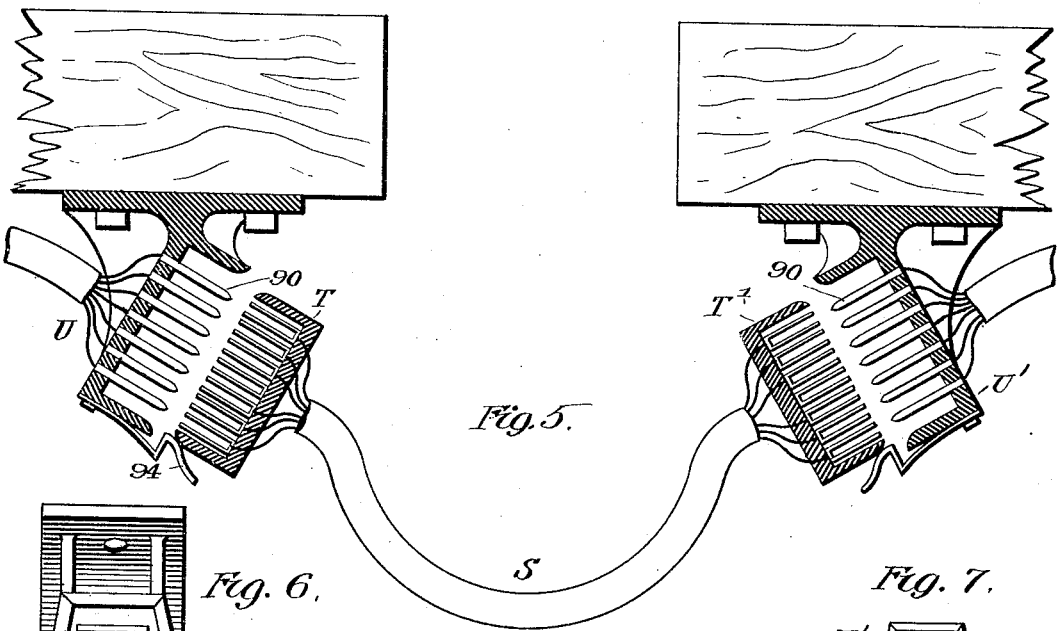
Fig. 5 illustrates, partly in section, the coupling-link heads T T' and the fixed coupling-heads U U'. The wire-terminals 90 in the fixed heads are inclined so that such heads face downward, thereby preventing moisture from collecting between said fingers.
Figures 6, 8:
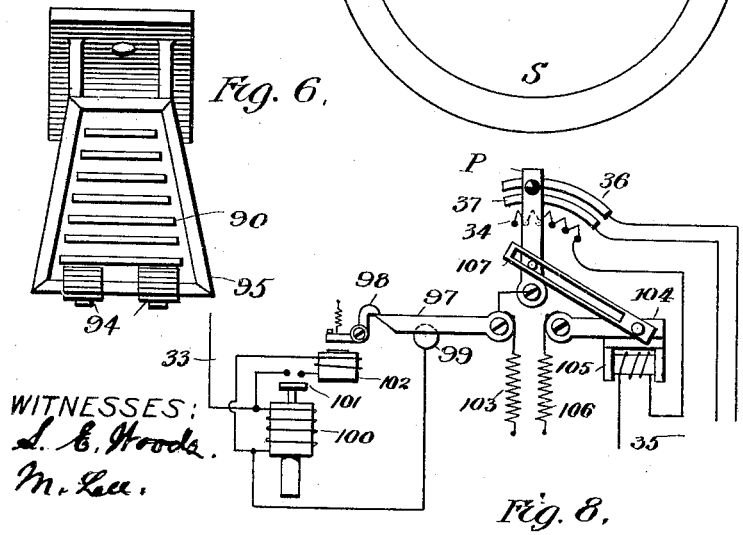
Fig. 6 is a face view of fixed head U.
Figure 7:
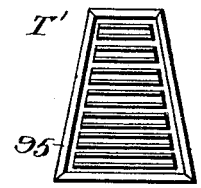
Fig. 7 is a face view of the coupling-link head T. The heads U T' are wider at the bottom 95 than at the top, so that they can be fitted into one another one way only.

Fig. 8 is an automatic switch which is adapted to supersede switch P, Fig. 1. When this switch, Fig. 8, is used, switch-handle P is moved toward the left until lever 97 passes under latch 98 and makes connection with contact 99. The lever 97 is locked by latch 98 as the latter lever passes under the said latch. Then handle P is moved toward the right, so as to make contact with contacts 34 36 37. If an abnormal current begins to flow over either of the latter contacts, then such current must also flow over wire 33, solenoid 100, contact 99, lever 97, and handle P. As such current acts upon solenoid 100 its core, which carries contact 101, is drawn upward until the latter contact closes the circuit of magnet 102. This magnet then draws latch 98 from lever 97, and spring 103 causes the latter lever to break its connection with contact 99, thereby opening the circuit. If no abnormal current flow after lever 97 is locked and contacts 34 36 37 are in circuit, then handle P is moved to the end of its path at the right. Then lever 104 is moved until it touches magnet 105, which is energized by current flowing through wire 35. If the current should cease to flow through magnet 105, then spring 106 would cause lever 104 to swing toward the left, and lever 107 would force handle P around so as to open the circuits at 34 36 37.

Fig. 9 is to diagrammatically illustrate the method by which contacts 22 23 are held to their seats against the previously-described contacts 20 21, &c. In practice some device, such as bar 108, may be arranged so that contacts 22 23 move between such bar and the fixed contacts 20 21, &c., and spring 109 should be carried (by core 24) adjacent to contacts 22 23, so that the latter spring would press against bar 108 and force the latter contacts to maintain their normal line of travel. Spring 110 is adapted to cause the contacts 22 23 to return to their initial starting position when the current ceases to control the core 24.

Having now described our invention, we do not limit ourselves to the details of construction.

What we claim as new is as follows:

1. In a system of motor control, the combination of a driving-motor, an electrical armature in series therewith, an electromagnetic field-magnet for said armature, a motor switch or controller in circuit with said field and adapted to control the same, and a commuting-switch, which, when manually operated, causes said motor switch or controller to change the resistance of said field-circuit.

2. In a system of motor control, the combination of a driving-motor, an electrical armature in series therewith, an electromagnetic field-magnet for said armature, a motor-switch in circuit with said field and adapted to vary and reverse such field, and a commuting-switch which, when operated manually, is adapted to cause said motor-switch to vary and reverse said field.

3. In a system of motor control, the combination of a driving-motor, an electrical armature in series therewith, an electromagnetic field-magnet for said armature, a motor-switch in circuit with said field and adapted to control the same, a commuting-switch in circuit with said motor-switch and adapted to control the same, and means adapted to reverse the driving-motor.

4. In a system of motor control, the combination of a driving-motor, an electrical armature in series therewith, an electromagnetic field-magnet for said armature, a motor-switch in circuit with said field and adapted to vary and reverse such field, a commuting-switch in circuit with said motor-switch and adapted to control the same, and means adapted to reverse said driving-motor.

5. In a system of motor control, the combination of a driving-motor, a generator-armature in series therewith, a field-magnet for said armature, a motive switch in circuit with said field and adapted to control the same, and an automatically-acting device in circuit with said driving-motor and adapted to move under the influence of an abnormal current and thereby interrupt the tendency of such current to damage said driving-motor.

6. In a system of electrical control, the combination of a driving-motor, a generator-armature in series therewith, a field-magnet for said armature, a motive switch having a step-by-step motion and adapted to control said field, a commuting-switch in circuit with said motive switch and adapted to control the action of the same, and means for reversing the driving-motor.

7. In a system of electrical control, the combination of a driving-motor, a generator-armature in series therewith, a field-magnet for said armature, a motive switch in circuit with said field and adapted to control the same, a commuting-switch in circuit with said motive switch and adapted to control the action thereof, and a switch in the field-circuit of said driving-motor and adapted to reverse the same.

8. In an electrical system, the combination of a driving-motor, a controller divided into sections, a commuting-switch adapted to energize said controller section by section, and means adapted to check the commuting-switch in its forward movement only, when such switch is operated in both directions by hand.

9. In an electrical system, the combination of a driving-motor, controller apparatus divided into sections, a commuting-switch adapted to energize said apparatus section by section, means adapted to check the movement of the latter switch, and means adapted to cause said commuting-switch to stand at open circuit when the latter is at rest.

10. The combination of a motor, a speed-controller a commuting-switch and means adapted to check said commuting-switch in its forward movement only when operated in both directions by hand.

11. The combination of a motor, a speed-controller a reversing device for said motor, a commuting-switch, and means adapted to check said commuting-switch in its forward movement only when operated in both directions by hand.

12. The combination of a motor, a speed-controller, a motor-reversing device, a single set of wires, and a commuting-switch provided with means to check it in its forward movement only and such switch being adapted to feed energy from said single set of wires to both the said controller and said reversing device.

13. In combination, an electrically-operated car or vehicle, a driving-motor therefor, a controller for said motor, a commuting-switch to govern said controller, and means adapted to act automatically and assist in bringing the car or vehicle to rest when manual control of said commuting-switch ceases.

14. In combination, a plurality of electrically-operated cars adapted to be connected together to form a train, a plurality of driving-motors for such cars, a motor-controller upon each car, a commuting-switch adapted to simultaneously control the entire number of said motors, and means adapted to act automatically and assist in bringing the car to rest when manual control of the commuting-switch ceases.

15. In combination, a controller comprising two parts, a fixed contact part and a movable contact part, the appropriate contact or contacts of one part being adapted to have a positive spring-pressure against the appropriate contact or contacts of the other part, a series of actuating devices adapted to move said movable part step by step, a commuting-switch adapted to successively bring said actuating devices into operation, and means adapted to prevent a rapid forward movement of said commuting-switch.

16. In combination, a controller comprising a set of fixed contacts and a set of movable contacts, a series of separately-actuating devices adapted to move said movable set of contacts step by step, through a series of operative positions, means adapted to successively bring said actuating devices into operation, and means adapted to yieldingly press the appropriate contacts of one set against the appropriate contacts of the remaining set.

17. In combination, a controller comprising a set of fixed contacts, and a set of movable contacts, a common support for said movable contacts, a series of separately-actuating devices for moving said set of movable contacts step by step, through a series of operative positions, means adapted to successively bring said actuating devices into operation, and elastic means adapted to press the appropriate contacts of one of said set, against the appropriate contacts of the remaining set.

18. In combination, a controller comprising a set of fixed contacts and a set of movable contacts, a plurality of separate actuating devices adapted to operate the said set of movable contacts, each of said actuating devices corresponding to a particular operative position of said set of movable contacts, means adapted to separately and successively energize said actuating devices, and means adapted to elastically press the appropriate contacts of one of said sets against the appropriate contacts of the remaining set.

19. In combination, a motor-controller comprising a set of fixed contacts and a set of movable contacts, a common support for said movable contacts, a series of separately-actuating devices for moving said set of movable contacts, each of said devices corresponding to a particular operative position of said movable contacts, means for successively energizing said actuating devices, and elastic means adapted to press the appropriate contacts of one of said set, against the appropriate contacts of the remaining set.

20. In combination, a controller comprising a set of fixed contacts and a set of movable contacts, a common support for said movable contacts, a plurality of separately-actuating devices adapted to shift said set of movable contacts through a series of operative positions, each of said actuating devices being adapted to move said support through a portion only of its full movement, a commuting-switch operatively connected to said actuating devices, said commuting-switch being constructed and arranged to successively energize said actuating devices, and means adapted to yieldingly press the appropriate contacts of one set against the appropriate contacts of the remaining set.

21. In a train system, a plurality of motor-controllers each having a set of fixed contacts and a set of movable contacts, each set of movable contacts being mounted upon a common support, a plurality of separately-actuating devices operatively related to the common support of each controller, each of said devices being adapted to move the said support through a portion only of its full movements, means adapted to connect the said actuating devices in multiple, a commuting-switch connected and arranged to supply current simultaneously to said actuating devices of the several controllers, and means adapted to yieldingly press the appropriate contacts in one set, against the appropriate contacts of the remaining set of the several controllers.

22. In a train system, a plurality of motor-controllers each comprising a set of fixed contacts and a set of movable contacts, a plurality of separately-actuating devices, operatively related to the movable contacts of each controller, each of said devices being adapted to move said movable contacts through a portion only of their full movements, a set of conductors extending through the train and to which said actuating devices are connected, a commuting-switch adapted to control the connection between a source of supply and said conductors to simultaneously move the movable contacts a predetermined distance.

23. In combination, a controller comprising fixed contacts and a movable contact or contacts, the faces of the appropriate contacts being pressed together by a spring-like pressure during their electrical connection, a series of separately-actuated coils adapted to move said movable contact or contacts, and means adapted to deliver energy, successively and at the will of the operator, to any portion of the entire number of said coils.

24. In combination, a controller comprising fixed contacts and movable contacts, a series of separately-actuated devices adapted to move said movable contacts step by step, in one direction only, through a series of operative positions, means adapted to return said movable contacts to their normal position, and means adapted to successively actuate said actuating devices.

25. In combination, a controller comprising fixed contacts and movable contacts, a set of actuating-coils adapted to move said movable contacts, and a commuting-switch adapted to deliver current to a circuit which includes a plurality of said actuating-coils less than the total number.

26. In combination, a controller provided with fixed contacts and movable contacts, a set of actuating-coils adapted to control said contacts, and a commuting-switch adapted to deliver current, successively, to a plurality of circuits, each such circuits including a plurality of said actuating-coils less than the total number.

27. In combination, a controller comprising fixed contacts and movable contacts, a set of actuating-coils adapted to actuate said movable contacts, a commuting-switch, a set of separately-energized circuits controlled thereby, each of such circuits containing a plurality of said coils, and a resistance in circuit with a plurality of such coils.

28. In combination, a controller comprising fixed contacts and movable contacts, a set of actuating-coils adapted to operate said movable contacts, a set of separately-energized circuits, each containing a plurality of said coils, and a commuting-switch adapted to deliver energy, at the will of the operator, to a plurality of said coils less than the total number.

29. The combination of a motor, a commuting-switch, and a controller comprising fixed contacts, movable contacts and a set of actuating-coils for operating said movable contacts, the said coils being adapted to receive energy in varying amounts, each coil causing the appropriate change in the contact connections when such coil receives its proper proportion of the current.

30. The combination of an electric motor, a controller therefor, a commuting-switch to govern said controller, a source of supply for said motor, and a regulating device in series with the armature of said motor and acting sometimes to receive energy from the line and sometimes to return energy to the line.

31. The combination of an electric motor, a controller therefor, a commuting-switch to govern said controller, a source of supply for said motor, and an inductive regulating device in series with the armature of said motor and acting to vary the electromotive force of the current delivered from said source of supply to said motor.

32. The combination of an electric motor, a controller therefor, a commuting-switch to govern said controller, a regulating-armature in series with the armature of said motor, and means adapted to drive said regulating-armature.

33. The combination of an electric motor, a controller therefor, a commuting-switch to govern said controller, a regulating-armature in series with the armature of said motor, and means adapted to reverse said motor.

34. The combination of an electric motor, a controller therefor, a commuting-switch to govern said controller, a regulating-armature in series with the armature of said motor, means adapted to drive said regulating-armature and means adapted to reverse said motor.

35. The combination of an electric motor, a controller therefor, a commuting-switch adapted to cause said controller to move step by step, a regulating-armature in series with the armature of said motor, and electromagnetic means for reversing said motor.

36. A train having a plurality of electrically-equipped cars, a regulating-armature upon each such car and in series with the armature of the car-driving motor, and a commuting-switch adapted to control the operation of the entire plurality of regulating-armatures.

37. A train having a plurality of electrically-equipped cars, a regulating-armature upon each such car and in series with the armature of the car-driving motor, means for reversing said motors and a commuting-switch adapted to control the entire plurality of regulating-armatures whereby the current delivered to said car-driving motors will be proportioned to the work performed by such motors.

38. In combination, a driving-motor, a speed-controller therefor, a commuting-switch and means adapted to vary the current in the motor-field circuit independently of the armature-circuit thereof.

39. In combination, a driving-motor, a speed-controller therefor, a commuting-switch means adapted to reverse said motor, and means adapted to vary the field strength of said motors, independently of the armature thereof.

40. In combination, a driving-motor, a speed-controller therefor, a commuting-switch in circuit with said speed-controller, and means adapted to vary the field strength of said motor, independently of the armature-circuit thereof.

41. In combination, a plurality of driving-motors having their fields in series with each other, a speed-controller for said motors, means for reversing said fields, and means adapted to vary the strength of said fields independently of the armature-circuits thereof.

42. In combination, a plurality of motors having their fields in series with each other, an electromagnetic device in series with the armature of said motor, and an electrically-operated reversing-switch in circuit with said fields.

43. In combination, a plurality of motors, having their fields connected in series with each other, an electromagnetic device in series with the armature of said motor, an electromagnetic reversing-switch in circuit with said fields, and means adapted to control the current which actuates said switch.

44. In combination, a plurality of motors, a speed-controller therefor, an electromagnetic device in series with the armature of said motor, a reversing-switch in circuit with the fields of said motors, and means adapted to actuate said reversing-switch.

45. In combination, a plurality of motors, a speed-controller therefor, a reversing-switch in circuit with the fields of said motors, an electromagnetic device in series with the armatures of said motors, means adapted to prevent sparking during the reversal of said motors, and means adapted to actuate said reversing-switch.

46. In combination, a plurality of motors, a speed-controller therefor, a commuting-switch adapted to actuate said speed-controller, a reversing-switch in circuit with the fields of said motors, an electromagnetic device in series with the armatures of said motors, means adapted to prevent sparking during the reversal of said motors, and means adapted to actuate said reversing-switch.

47. The combination of a motor, a speed-controller, a commuting-switch, and an automatic circuit-controller, the latter controller having two levers which constantly tend to move to open the circuit, one of such levers being held in its normal position by a latch and the other lever is held in its normal position by a magnet.

48. The combination of a motor, a speed-controller, a commuting-switch, an automatic circuit-controller having two levers, one of such levers being held in its normal position by a latch and means adapted to act, upon an excessive flow of current, and release said lever.

49. In combination, a motor, a controller therefor, a spring-controlled commuting-switch adapted to electrically actuate said controller through a series of operative positions, and a spring adapted to return said controller to its normal position.

50. In combination, a motor, a controller therefor, a commuting-switch adapted to govern the controller and means such as a spring constantly tending to restore the controller to its normal position independently of the retrograde movement of the commuting-switch.

51. In combination, a motor, a controller therefor, a commuting-switch adapted to govern said controller, a reversing-switch for said motor, and means such as a spring constantly tending to restore the controller to its normal position independently of the retrograde movement of said commuting-switch.

52. In combination, a motor, a controller therefor, and a commuting-switch adapted to be connected, through the coils of said controller, to a two-point switch, one of the points of the latter switch being connected to a branch circuit in series with the motor, and the remaining switch-point being connected to a circuit in parallel with the motor.

53. In combination, a motor, a motor-controller comprising fixed contacts and movable contacts, a motor-reversing device, a plurality of commuting-switches, a commuting-switch line connected between the latter switches, and a connection between said line and said controller whereby either of the commuting-switches will be enabled to cause said controller to be energized section by section and to move step by step.

54. The combination of a train having a plurality of electrically-equipped cars, each of such equipments having a motor-controller with spring-pressed contacts and a commuting-switch to energize the controller section by section, and means adapted to make a direct electrical connection between the commuting-switch on car and a like device on another car independently of the sequence of the equipped cars.

55. In a system of electrical control, the combination of a driving-motor and its circuits, speed or work controlling apparatus for said motor, a commuting-switch adapted to govern said controlling apparatus, motor-reversing mechanism connected to said motor-circuits, and an independent switch adapted to deliver energy to said reversing mechanism each time the latter is operated, the said mechanism being inactive except during the reversal of said motor.

56. A car provided with a motor, motor-controlling apparatus, a plurality of commuting-switches, and a group of commuting-switch wires, said wires having branches leading to the controlling apparatus, and other branches leading to coupling-heads at each end of the car, all of the wires being connected in said heads in a single vertical or substantially vertical series, the serial number of a given wire connection in one head being a duplicate of such connection in the other head.

57. The combination of a plurality of cars, driving-motors upon several of said cars, controller apparatus for said motors, spring-pressed contacts for such controllers, commuting-switches upon each equipped car and adapted to energize said controller apparatus section by section and means for directly connecting the commuting-switch wires of one car in series with such wires on another car independently of the sequence or end relation of the cars.

58. In a system of electrical control, the combination of a plurality of cars, driving-motors and their circuits upon some of said cars, speed-controlling apparatus upon each motor-equipped car, fixed contacts and movable contacts being included in said speed-controlling apparatus, a commuting-switch adapted to govern all of the speed-controlling apparatus simultaneously, means, such as springs, relating to said movable contacts, whereby the latter contacts constantly tend to open the motor-circuits, and means, such as a spring, located at said commuting-switch whereby all of said movable contacts will be caused to act automatically and open the motor-circuits upon failure of the motorman to control said commuting-switch while actuating-current is being delivered to said motors.

Signed at New York, in the county of New York and State of New York, this 23d day of January, A. D. 1898.

GRANVILLE T. WOODS.
LYATES WOODS.

Witnesses:
S. E. WOODS,
O. E. KELLES.